(12) United States Patent
Kohara et al.

(10) Patent No.: US 7,100,966 B2
(45) Date of Patent: Sep. 5, 2006

(54) VENTILATION STRUCTURE OF AUTOMOBILE DOOR

(75) Inventors: Yoshihiro Kohara, Hiroshima-ken (JP); Takashi Yamashita, Hiroshima-ken (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 11/092,783

(22) Filed: Mar. 29, 2005

(65) Prior Publication Data

US 2006/0012215 A1    Jan. 19, 2006

(30) Foreign Application Priority Data

Jul. 13, 2004    (JP) ............................. 2004-205580

(51) Int. Cl.
    *B60J 9/00* (2006.01)
(52) U.S. Cl. .................... 296/154; 296/208; 296/146.7
(58) Field of Classification Search ................ 296/208, 296/146.1, 149, 154, 146.7, 1.06
    See application file for complete search history.

(56) References Cited

U.S. PATENT DOCUMENTS 3,024,717 A  *  3/1962  Rozek ......................... 296/208
3,158,176 A  * 11/1964  Toland ........................ 296/208
3,382,889 A  *  5/1968  Heinz et al. ................. 296/154
3,392,654 A  *  7/1968  Grenier ........................ 454/75
4,445,721 A  *  5/1984  Yaotani et al. .............. 296/154
5,462,482 A  * 10/1995  Grimes ........................ 296/154

FOREIGN PATENT DOCUMENTS

JP          3214189          7/2001

* cited by examiner

*Primary Examiner*—Jason Morrow
(74) *Attorney, Agent, or Firm*—Flynn, Thiel, Boutell & Tanis, P.C.

(57) ABSTRACT

There is provided a ventilation structure formed in an automobile door, which is made up of a door inner panel having a hole therethrough. A door hole seal is installed in an interior side of the door inner panel. The door hole seal has a slit or an air hole nearby the hole of the door inner panel, and it covers at least the hole. A door trim is installed on the interior side of the door inner panel sandwiching the door hole seal in combination with the door inner panel. There is/are partially or successively formed a gap or gaps between a periphery of the door trim and the door inner panel. At the time the door is closed, the air in the interior of an automobile is ejected to the exterior of the automobile through the gap or the gaps, the slit or the air hole, and a drain hole which is formed in the door inner panel.

14 Claims, 4 Drawing Sheets

VENTILATION STRUCTURE OF AUTOMOBILE DOOR

BACKGROUND OF THE INVENTION

This invention relates to a ventilation structure formed in an automobile door in order to obtain a good closing performance of a door.

Generally, there is provided a ventilation structure in an automobile door in order to improve a closing performance of a door by restraining a pressure which increases in an interior of an automobile when the door is closed.

There has been a type of ventilation structure which comprises a comparatively complicated structure (See, for example, Japanese Patent No. 3214189). There has also been a type which comprises a simple structure in which an air vent having a diameter of smaller than 1 mm is provided in a door stopper rubber, or in which a hole is provided in a part of a body panel near by a door.

However, the type having a complicated structure is susceptible to improvement in productivity since it is costly in production and is difficult in production and installation operations.

Further, the type having a simple structure has a problem in the noise insulation performance. That is, the structure having the air vent for a better closing operation of a door allows the outside noise to invade into an interior of an automobile through the air vent, leading to a deterioration of the noise insulation performance.

SUMMARY OF THE INVENTION

This invention is intended to overcome the above-mentioned problem, and, therefore, it is an object of this invention to provide a ventilation structure which is improved in a closing performance of a door without deteriorating a noise insulation performance, and which is superior in productivity.

The invention will be described hereinafter referring to FIGS. 1 to 8.

According to a first aspect of the invention, there is provided a ventilation structure formed in an automobile door, which comprises a door inner panel 1 having a hole 1a therethrough. There is installed a door hole seal 3 at an interior side of the door inner panel 1. The door hole seal 3 has a slit 3a or an air hole nearby the hole 1a of the door inner panel 1, and it covers at least the hole 1a. A door trim 4 is installed on the interior side of the door inner panel 1 sandwiching the door hole seal 3 in combination with the door inner panel 1. There is/are partially or successively formed a gap or gaps 10 between a periphery of the door trim 4 and the door inner panel 1. At a time the door is closed, the air in the interior of an automobile is ejected to the exterior of the automobile through the gap 10 or the gaps 10, the slit 3a or the air hole, and a drain hole 1b which is formed in the door inner panel 1.

According to a second aspect of the invention, there is provided a ventilation structure formed in an automobile door, which comprises a door inner panel 1 having a hole 1a therethrough. A door hole seal 3 is installed at an interior side of the door inner panel 1. The door hole seal 3 has a slit 3a or an air hole near by the hole 1a. The door hole seal 3 covers at least the hole 1a. A door trim 4 is installed on the interior side of the door inner panel 1 sandwiching the door hole seal 3 in combination with the door inner panel 1. There is/are partially or successively formed a gap or gaps between a periphery of the door trim 4 and the door inner panel 1. A cover piece 5 is swingably installed on an exterior side of the automobile. The cover piece 5 covers the slit 3a or the air hole. The cover piece 5 is provided with a noise insulation performance and a waterproof performance. At a time the door is closed, the air in the interior of an automobile is ejected to the exterior of the automobile through the gap 10 or the gaps, the slit 3a or the air hole, and a drain hole 1b formed in the door inner panel 1.

According to a third and fourth aspect of the invention, there is provided a ventilation structure of an automobile door described in the first or second aspect of the invention, wherein a pass hole 20 is formed with the gap 10 or instead of the gap 10 at a portion hardly visible in an interior of a pocket 4a of the door trim 4 or around the pocket 4.

According to a fifth to eighth aspect of the invention, there is provided a ventilation structure of an automobile described in the first to the fourth aspects of the invention, wherein the air in an interior of an automobile is ejected to an exterior of the automobile through a space 30 which is formed between front and back ends of a belt line weather strip 6, the door inner panel 1 and a door outer panel 2. The space 30 is formed with the drain hole 1b of the door inner panel 1 or instead of the drain hole 1b.

According to the ventilation structure in the first aspect of the invention, at a time the door is closed, the air in the interior of the automobile is smoothly ejected to the exterior of the automobile through the gap 10, the slit 3a or the air hole, and the drain hole 1b formed in the door inner panel 1. It is because the ventilation structure is constructed such that the door trim 4 is installed on the door inner panel 1 sandwiching the door hole seal 3 between them, and the door hole seal 3 is provided with the slit 3a or the air hole which is formed at a portion nearby the hole 1a of the door inner panel 1. Further, the gap 10 or the gaps 10 is/are provided between the door inner panel 1 and the door trim 4. Therefore, a good closing performance of a door can be obtained.

Further, according to this ventilation structure, there can be obtained a good noise insulation performance by the door hole seal 3, since the door hole seal 3 is provided between the door inner panel 1 and the door trim 4.

Moreover, this ventilation structure is simple in structure as the door hole seal 3 is simple in structure, and the hole 1a and the drain hole 1b used to eject the interior air have conventionally been formed in the door panel 1. Therefore, production and installation operations become easier, and the productivity can be improved as the production cost is reduced.

According to the ventilation structure in the second aspect of the invention, there can be obtained, like the first aspect of the invention, a good closing performance of a door, a good noise insulation performance and a good productivity.

Further, the cover piece 5 having a noise insulation performance and a water proof performance is swingably installed on the exterior side of the door hole seal 3 covering the slit 3a or the air hole, so that the noise insulation performance can be further improved. Moreover, it prevents rain water and car washing water from invading into the interior of the automobile through the slit 3a or the air hole.

According to the ventilation structure in the third and fourth aspects of the invention, the air in the interior of the automobile can be smoothly ejected to the exterior of the automobile through the pass hole 20, the slit 3a or the air hole, and the drain hole 1b of the door inner panel 1, as the pass hole 20 is formed at the portion hardly visible in the interior of or around the pocket 4a provided in the door trim 4 with the gap 10 or instead of the gap 10. Therefore, a good closing performance of a door can be obtained while maintaining a good noise insulation performance.

According to the ventilation structure in the fifth to the eighth aspects of the invention, there can be obtained a good closing performance of a door and a good noise insulation as well, since the air in the interior of the automobile is ejected through the space 30 which is formed between the front and back ends of the belt line weather strip 2, the door inner panel 1 and the door outer panel 2, with the drain hole 1b or instead of the drain hole 1b of the door inner panel 1. Further, the space 30 has conventionally been formed like the drain hole 1b, so that it is unnecessary to add any extra production operation to form the space 30. Therefore, it is also good in productivity.

DESCRIPTION OF THE PREFERRED EMBODIMENT

Figure 1:
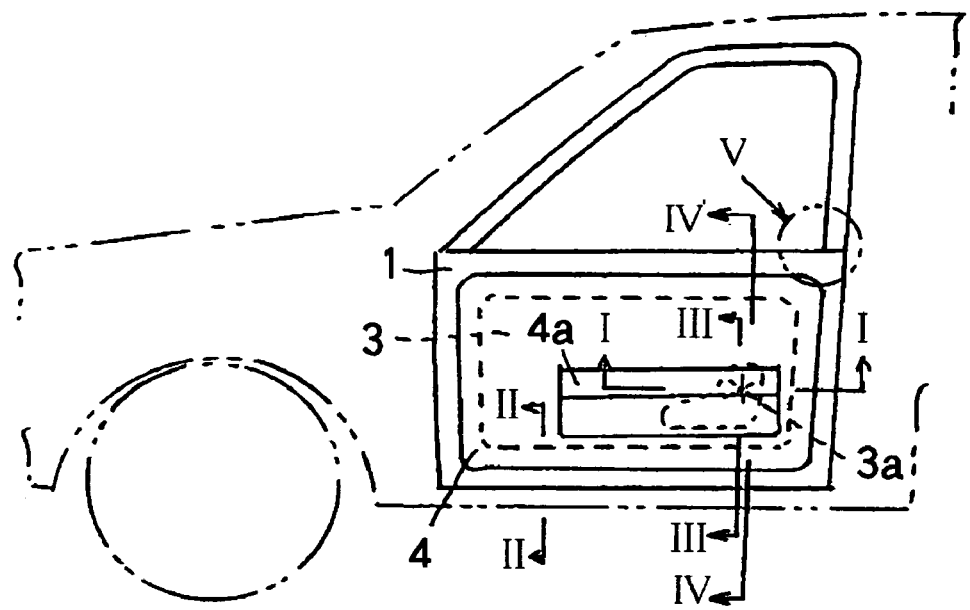
FIG. 1 is a side elevation view showing an interior side of an automobile door comprising a ventilation structure according to a preferred embodiment of the invention.
Figure 2:
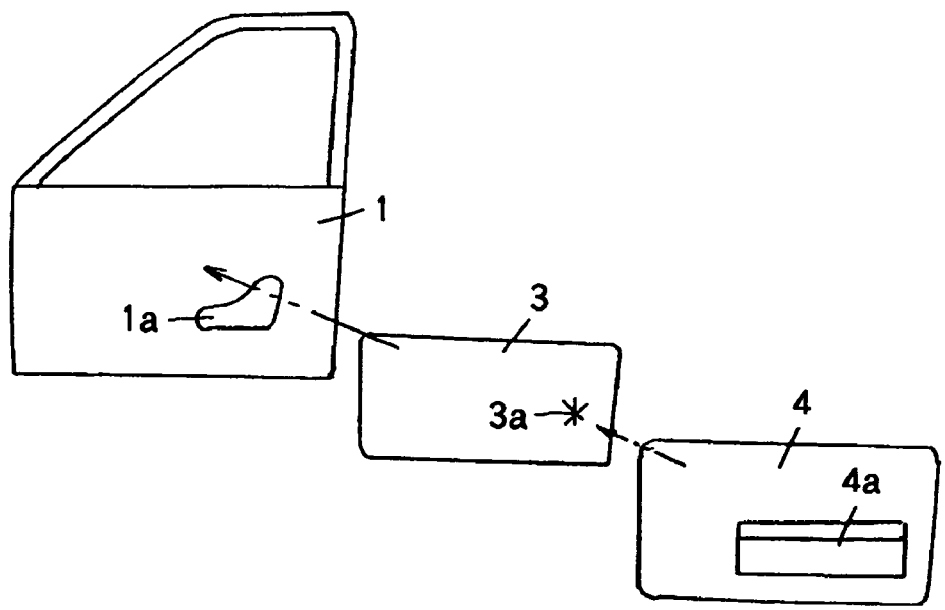
FIG. 2 is an exploded side elevation view showing the ventilation structure shown in FIG. 1.
Figure 3:
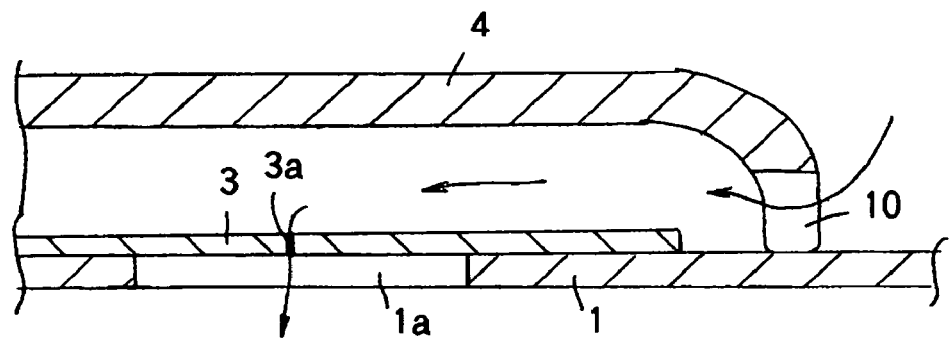
FIG. 3 is an enlarged sectional view along line I—I in FIG. 1.
Figure 4:
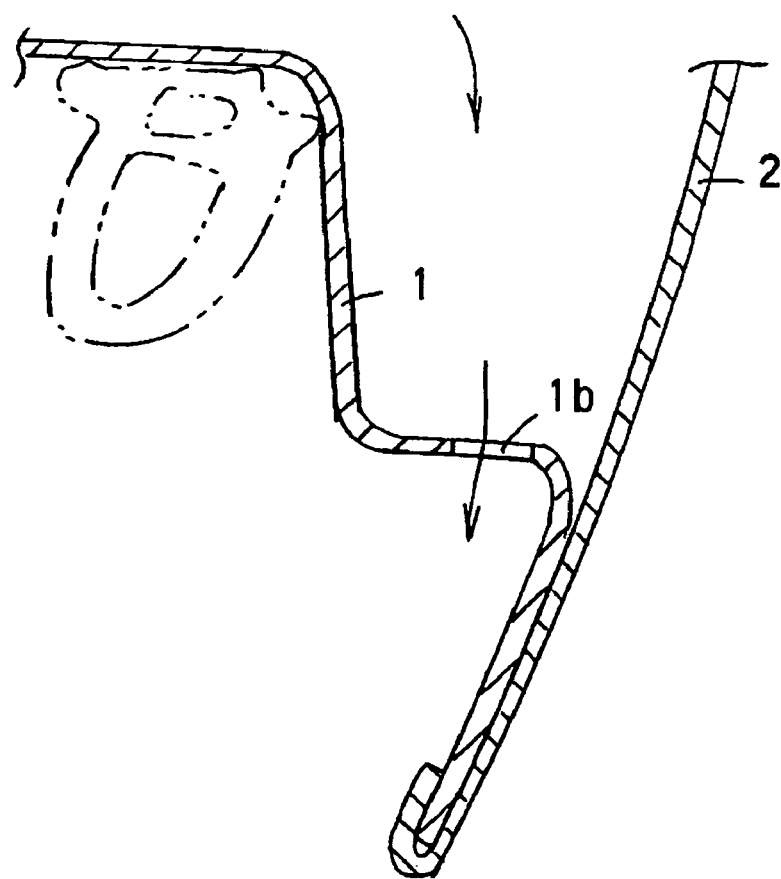
FIG. 4 is an enlarged sectional view along line II—II in FIG. 1.

A ventilation structure according to a preferred embodiment of the invention is illustrated in FIGS. 1 to 5. This ventilation structure comprises a door hole seal 3 which is installed at an interior side of a door inner panel 1 along roughly an entire portion thereof. The door inner panel 1 has a hole 1a for an installation of an elevating mechanism of a door glass. The door hole seal 3 is provided with a slit 3a which is formed at a portion nearby the hole 1a.

Although the door hole seal 3 can be formed of a resin film generally used, it preferably is formed of a resin foam or EPDM (ethylene-propylene terpolymer) with consideration of noise insulation performance and workability.

Further, a door trim 4 is installed on an entire portion of the interior side of the door inner panel 1 sandwiching the door hole seal 3 therebetween. A plurality of gaps 10 are partially (intermittently) formed between the periphery portion of the door trim 4 and the door inner panel 1. It should be noted that the gap 10 can be continuously formed around the entire periphery portion of the door trim 4.

Figure 5:
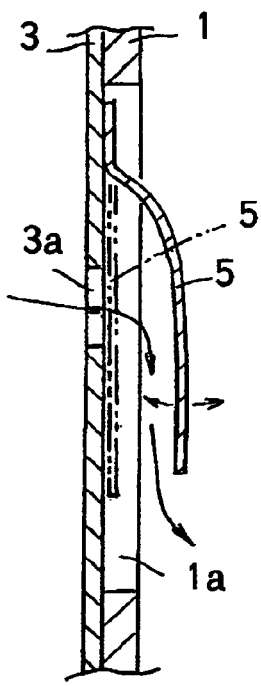
FIG. 5 is an enlarged sectional view along line III—III in FIG. 1.
Figure 6:
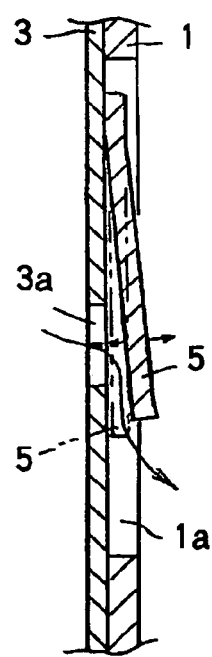
FIG. 6 is an enlarge sectional view along line III—III in FIG. 1 showing a ventilation structure according to another preferred embodiment of the invention.

Moreover, a cover piece 5 having a noise insulation performance and a waterproof performance is swingably installed on an exterior side of the automobile covering the slit 3a. As illustrated in FIG. 5, the cover piece 5 can be formed with a thin resin sheet, or as illustrated in FIG. 6, it can be formed with a lid member which is thicker than the resin sheet. In both cases, they can swingably be installed by fixing the upper portions thereof. A means for fixing the upper portions is not limited and, for example, it can be fixed by adhesion.

The ventilation structure according to the preferred embodiment of the invention is operated as described below. When a door of an automobile is closed, the air in an interior of the automobile passes through the slit 3a after passing through the gap 10 formed between the door inner panel 1 and the door trim 4. At this moment, the slit 3a is opened by the pressure of the air, and the cover piece 5 swings by the pressure of the air, so that the air is able to smoothly pass through the slit 3a. The air then passes through the drain hole 1b formed in the door inner panel 1 after coming through an open space formed between the door inner panel 1 and the door outer panel 2, and it is finally ejected to an exterior side of the automobile. After the air is ejected, the cover piece 5 returns to its original form and covers the slit 3a as is before.

As described above, with the ventilation structure according to the preferred embodiment of the invention, the air in the interior of the automobile can smoothly be ejected to the exterior of the automobile, so that a good closing performance of a door can be obtained. It should be noted that according to this ventilation structure, the closing speed of a door can be improved by at least about 0.1 m/second, improving the closing performance of a door.

Further, the ventilation structure comprises the door hole seal 3 which is installed at the interior side of the door inner panel 1, so that a good noise insulation performance can be maintained. Moreover, the door hole seal 3 used in this structure is made of a simple member, and the hole 1a as well as the drain hole 1b used have conventionally been formed, so that the construction of the ventilation structure is simple and the installation operation thereof is easy. Therefore, the production cost is low and the productivity thereof is superior.

Moreover, the slit 3a is covered by the swingable cover piece 5 which is provided with the noise insulation performance as well as the waterproof performance, so that the noise insulation performance of the ventilation structure is further improved, and that water, such as rain water, is further prevented from invading into the interior of the automobile through the slit 3a.

It should be noted that in this preferred embodiment, the slit 3a is formed in the door hole seal 3, however, instead of the slit 3a, an air hole (a tiny hole) can be formed. Further, the number of slits 3a (or the air hole) is not limited.

Figure 7:
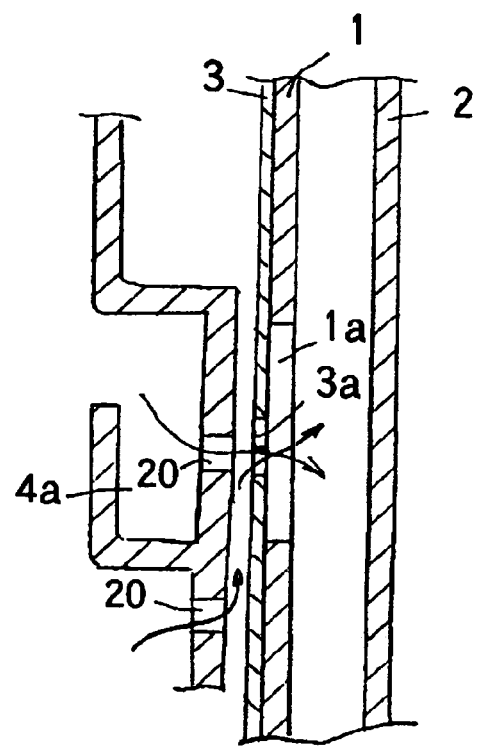
FIG. 7 is an enlarged sectional view along line IV—IV in FIG. 1 showing a ventilation structure according to another preferred embodiment of the invention.

As illustrated in FIG. 7, a ventilation structure according to the invention can be provided with a pass hole 20 with the gap 10, or instead of the gap 10, at a portion hardly visible inside a pocket 4a of the door trim 4 or around the pocket 4a, in order to eject the air in the interior of the automobile to the exterior of the automobile through the pass hole 20.

Figure 8:
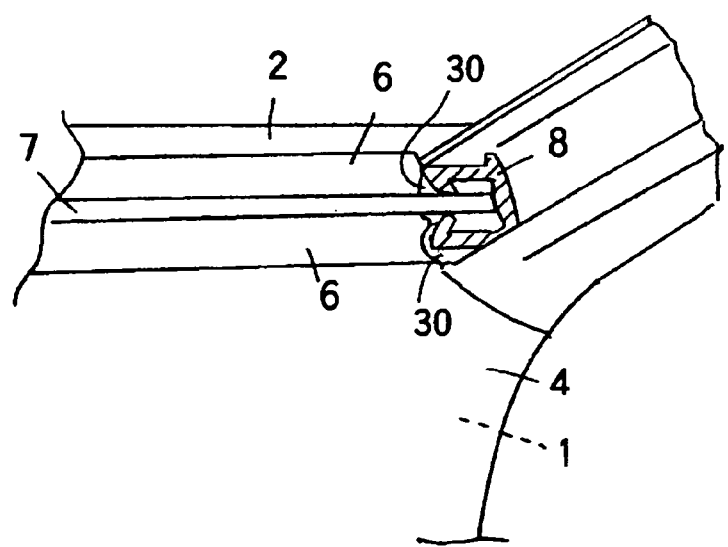
FIG. 8 is a perspective view of a portion indicated by "V" in FIG. 1 showing a ventilation structure according to still another preferred embodiment of the invention.

Moreover, as illustrated in FIG. 8, the air in the interior of the automobile can be ejected to the exterior of the automobile through a space 30 which is formed with the drain hole 1b, or instead of the drain hole 1b of the door inner panel 1, between front and back ends of a belt line weather strip 6, the door inner panel 1 (the door trim 4) and the door outer panel 2.

According to the ventilation structure, the closing performance of a door can be further improved by ejecting the air in the interior of the automobile through the space 30 as well as through the drain hole 1b. Further, the ventilation structure is good in productivity as the space 30 has conventionally been formed like the drain hole 1b, and thus no additional operation processes are required to form the space 30.

What is claimed is:

1. A ventilation structure formed in an automobile door which comprises:
   a door inner panel having a hole therethrough;
   a door hole seal installed at an interior side of said door inner panel, having a slit or an air hole near said hole, and covering at least said hole;
   and a door trim installed on the interior side of said door inner panel sandwiching said door hole seal in combination with said door inner panel, partially or successively forming a gap or gaps between a periphery thereof and said door inner panel; wherein,
   air in an interior of an automobile is ejected outside of the automobile through said gap, said slit or air hole, and a drain hole of said door inner panel at a time said door is closed.

2. A ventilation structure formed in an automobile door which comprises:
   a door inner panel having a hole therethrough;
   a door hole seal installed at an interior side of said door inner panel, having a slit or an air hole near said hole, and covering at least said hole;
   a door trim installed on the interior side of said door inner panel sandwiching said door hole seal in combination with said door inner panel, partially or successively forming a gap or gaps between a periphery thereof and said door inner panel;
   and a cover piece swingably installed on an exterior side of the automobile, covering said slit or said air hole, and having a noise insulation function and a waterproof function, wherein,
   air in an interior of an automobile is ejected outside of the automobile through said gap, said slit or air hole, and a drain hole of said door inner panel at a time said door is closed.

3. A ventilation structure of an automobile door claimed in claim 1, wherein a pass hole is formed in an interior of a pocket of said door trim or around said pocket.

4. A ventilation structure of an automobile door claimed in claim 2, wherein a pass hole is formed in an interior of a pocket of said door trim or around said pocket.

5. A ventilation structure of an automobile claimed in claim 1, wherein the air in an interior of an automobile is ejected to an exterior of said automobile through a space formed between front and back ends of a belt line weather strip, said door inner panel and a door outer panel.

6. A ventilation structure of an automobile claimed in claim 2, wherein the air in an interior of an automobile is ejected to an exterior of said automobile through a space formed between front and back ends of a belt line weather strip, said door inner panel and a door outer panel.

7. A ventilation structure of an automobile claimed in claim 3, wherein the air in an interior of an automobile is ejected to an exterior of said automobile through a space formed between front and back ends of a belt line weather strip, said door inner panel and a door outer panel.

8. A ventilation structure of an automobile claimed in claim 4, wherein the air in an interior of an automobile is ejected to an exterior of said automobile through a space formed between front and back ends of a belt line weather strip, said door inner panel and a door outer panel.

9. A ventilation structure formed in an automobile door which comprises:
   a door inner panel having a hole therethrough;
   a door hole seal installed at an interior side of said door inner panel, having a slit or an air hole near said hole, and covering at least said hole;
   and a door trim installed on the interior side of said door inner panel sandwiching said door hole seal in combination with said door inner panel; wherein
   a pass hole is formed in an interior of a pocket of said door trim or around said pocket and air in an interior of an automobile is ejected outside of the automobile through said pass hole, said slit or air hole, and a drain hole of said door inner panel at a time said door is closed.

10. A ventilation structure formed in an automobile door which comprises:
    a door inner panel having a hole therethrough;
    a door hole seal installed at an interior side of said door inner panel, having a slit or an air hole near said hole, and covering at least side hole;
    a door trim installed on the interior side of said door inner panel sandwiching said door hole seal in combination with said door inner panel;
    and a cover piece swingably installed on an exterior side of the automobile, covering said slit or air hole, and having a noise insulation function and a waterproof function; wherein
    a pass hole is formed in an interior of a pocket of said door trim or around said pocket and air in an interior of an automobile is ejected outside of the automobile thorugh said pass hole, said slit or air hole, and a drain hole of said door inner panel at a time said door is closed.

11. The ventilation structure of an automobile claimed in claim 1, wherein the air in an interior of an automobile is ejected to an exterior of said automobile through a space formed with a drain hole of said door inner panel.

12. The ventilation structure of an automobile claimed in claim 2, wherein the air in an interior of an automobile is ejected to an exterior of said automobile through a space formed with a drain hole of said door inner panel.

13. The ventilation structure of an automobile claimed in claim 3, wherein the air in an interior of an automobile is ejected to an exterior of said automobile thorugh a space formed with a drain hole of said door inner panel.

14. The ventilation structure of an automobile claimed in claim 4, wherein the air in an interior of an automobile is ejected to an exterior of said automobile through a space formed with a drain hole of said door inner panel.

* * * * *